United States Patent [19]

Schultz et al.

[11] Patent Number: 4,989,711
[45] Date of Patent: Feb. 5, 1991

[54] CENTRIFUGAL CLUTCH CONTROLLER

[76] Inventors: William H. Schultz, P.O. Box 204, Pfafftown, N.C. 27040; Robert A. Eakins, 4842 Mangrove Ave., Covina, Calif. 91723; Robert J. Bernstein, 664 Blue Bell Ct., Wellington, Fla. 33414

[21] Appl. No.: 529,373

[22] Filed: May 29, 1990

[51] Int. Cl.$^5$ .................. F16D 25/08; F16D 43/06
[52] U.S. Cl. .................. 192/105 F; 192/91 H; 192/103 A; 192/105 C
[58] Field of Search ............. 192/105 F, 105 C, 91 A, 192/103 A, 70.3, 83

[56]  References Cited

U.S. PATENT DOCUMENTS

| 1,995,406 | 3/1935 | Tower | 192/105 C |
| 2,232,452 | 2/1941 | Haupt | 192/105 |
| 3,443,673 | 5/1969 | Rosenberger | 192/83 |
| 3,455,422 | 6/1969 | Spar et al. | 192/105 C |
| 3,580,372 | 5/1971 | Schiefer | 192/105 C |
| 4,111,291 | 9/1978 | Horstman | 192/105 C |
| 4,144,958 | 3/1979 | Polyak et al. | 192/105 F |
| 4,561,531 | 12/1985 | Young et al. | 192/91 A |
| 4,620,625 | 11/1986 | Ladin | 192/91 A |
| 4,660,694 | 4/1987 | Nix et al. | 192/91 A |

FOREIGN PATENT DOCUMENTS 1255002 11/1971 United Kingdom ............. 192/91 A

OTHER PUBLICATIONS

McLeod Industries-Catalog Item (Looseleaf) not dated.
Growerglide-Mfgs. Loose Leaf Catalog Items Including Cover and pp. 3, 6 and 7-not dated.
TM9-9200 Dept. of Army Tech. Manual Dept. of the Army, Nov. 1947, pp. 258 and 261.

*Primary Examiner*—Dwight Diehl
*Assistant Examiner*—Andrea Pitts
*Attorney, Agent, or Firm*—Georges A. Maxwell

[57]  ABSTRACT

A controller for a centrifugal clutch with circumferentially spaced actuating weights having radially inwardly projecting actuating arms that pivot rearwardly as the rate of rotation of the clutch accelerates and the weights move to increase actuating pressure in and through the clutch. The controller includes a fluid actuated cylinder and piston unit with a piston rod that carries an arm engages throw-out bearing positioned rearward of the actuating arms. The cylinder is normally charged with a fluid medium that urges the piston and rod forwardly to one end of the cylinder and where the throw-out bearing engages and stops the arms in their normal unactuated position. The cylinder is connected with fluid handling parts that operate to bleed liquid from the cylinder and to allow the piston, rod and throw-out bearing to move rearwardly at a predetermined programmed rate and to restrain pivoting of the arms and weights to a rate that is less than the rate at which the weights and arms would move if not restrained and to thereby slow and control the rate of increase of actuating pressure in and through the clutch.

21 Claims, 2 Drawing Sheets

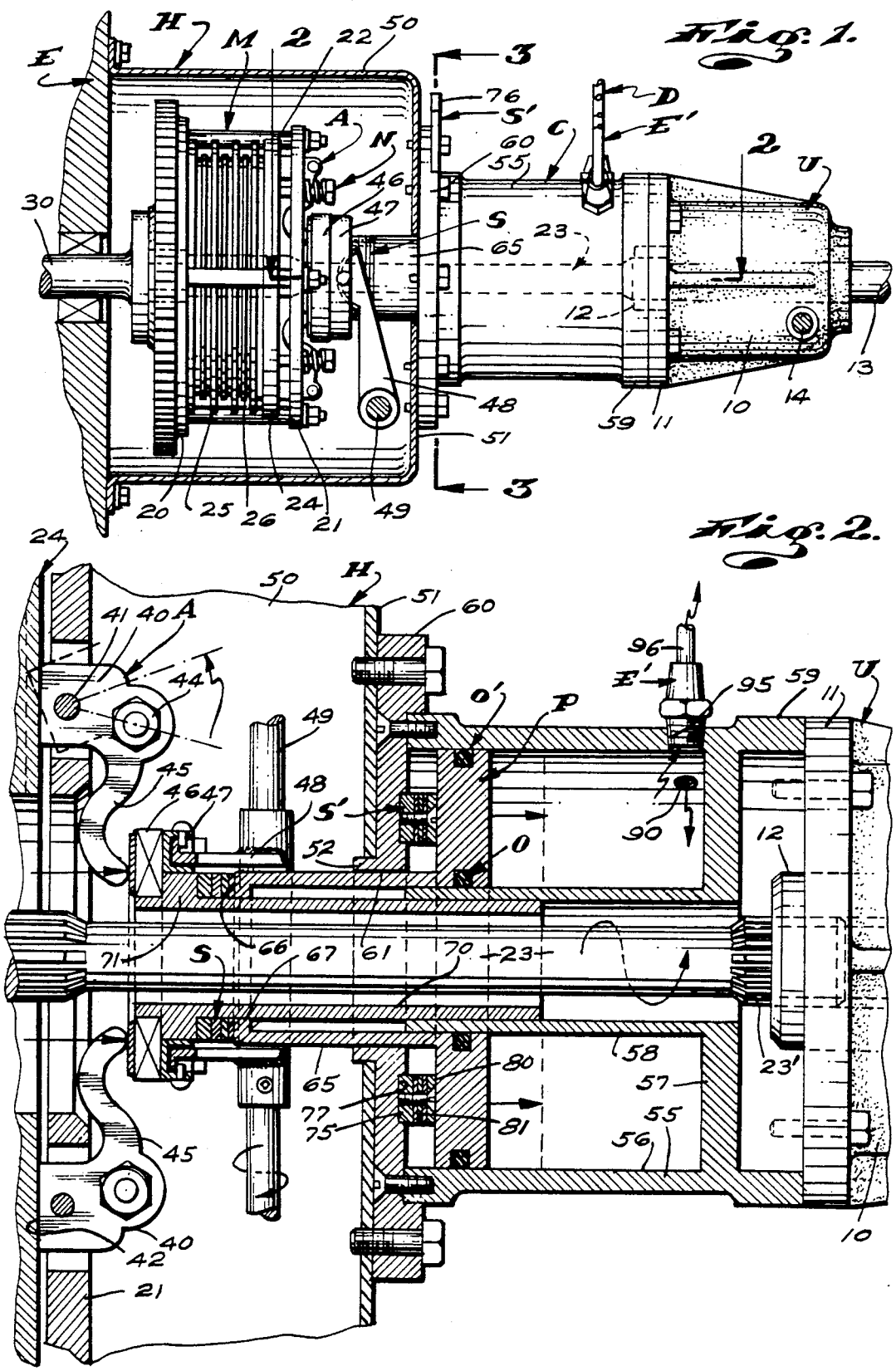

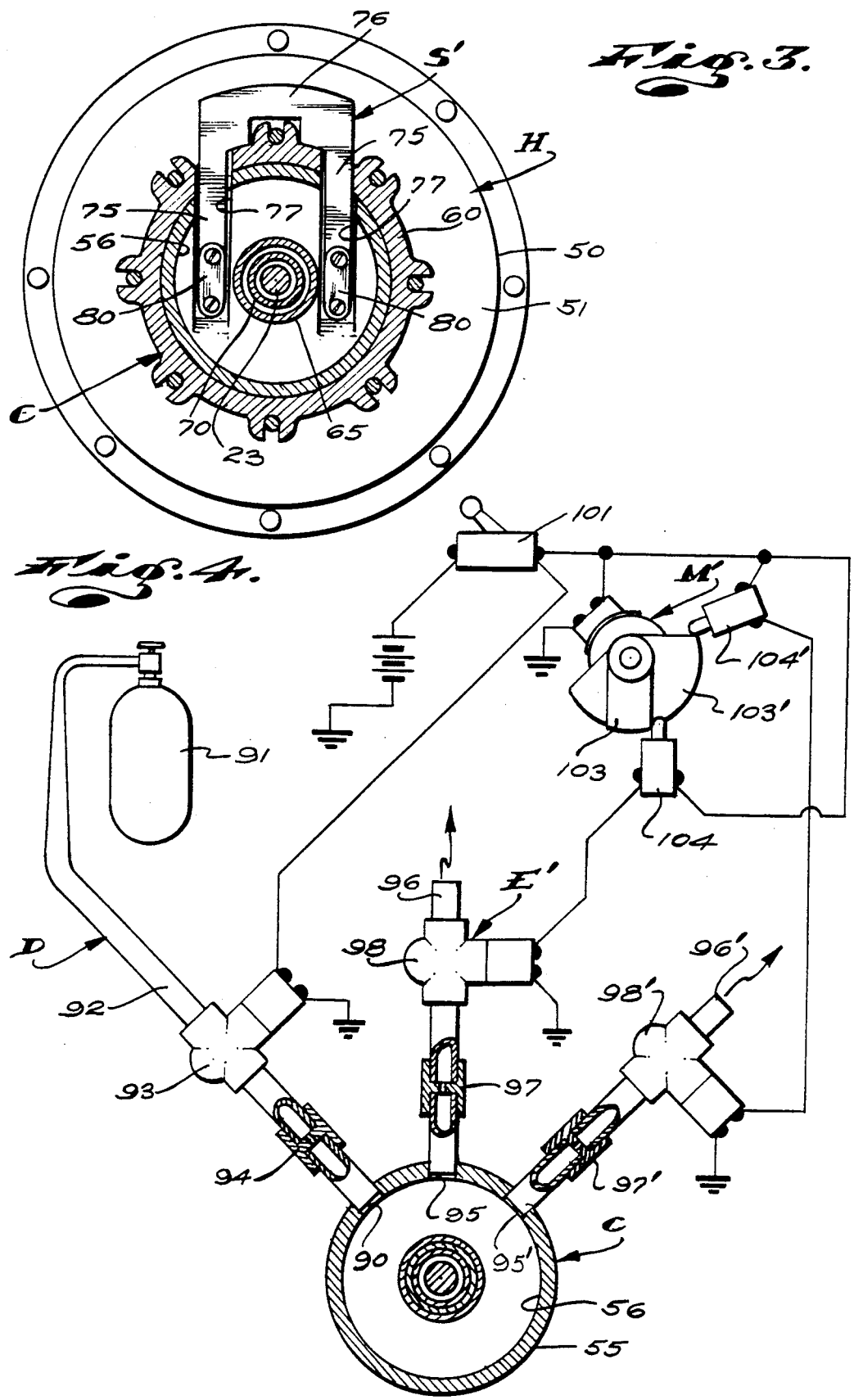

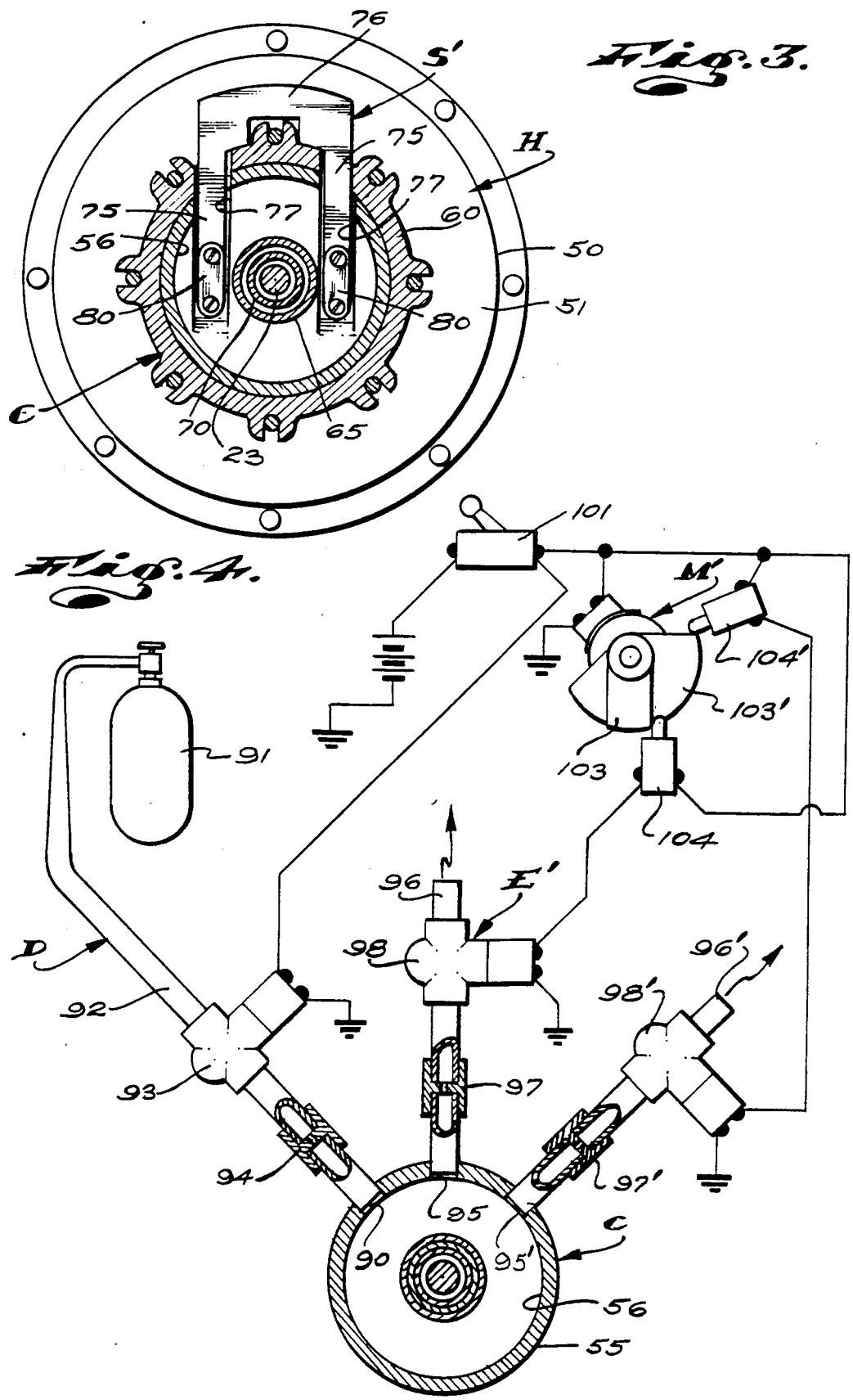

CENTRIFUGAL CLUTCH CONTROLLER

PRIOR ART

Applicants are unaware of any prior art relating to the operation and control of automotive type centrifugal clutches that teaches or suggests controlling the rate of increase of actuating pressure in and through such clutches as their rate of rotation increases by directly controlling the rate of pivotal movement of the actuating arms on the weights of such clutches by means of a fluid charged cylinder and piston unit with a piston rod that carries a throw-out bearing that is acted upon by the actuating arms and the movement of which, by said arms, is slowed and controlled by the controlled bleeding of fluid from the cylinder.

BACKGROUND OF THE INVENTION

In the art of auto racing, "drag racing" is a competitive event wherein competing autos, or cars, seek to start and travel from a starting line or gate to and across a finish line or gate on a straight race course of predetermined length, in the least elapsed time. The race courses are straight, well maintained, paved roadways that are commonly called drag strips or strips. In the United States, drag strips are straight elongate macadam-paved roadways having central racing lane portions that are one-quarter mile long, from starting lines or gates to finish lines or gates. Typically, drag strips have short starting lane portions before the starting gates and have lengthy finish lanes that follow or continue from the finish gates.

In foreign countries where metric measurements are used, the distance between the gates is likely to be slightly more or less than one-quarter miles.

There are several different classes of drag racing cars. The most popular and important class of cars are commonly referred to as "rails". Rails are four-wheel vehicles with elongate frames and are powered by internal combustion engines. There are several different sub-classes of rails, each of which is characterized by particular limitations or specifications with respect to the power plants or engines that are used to drive them.

The most powerful and fastest drag racing cars of today are powered by internal combustion engines that develop several thousands of horsepower and that drive the cars through quarter-mile courses, from start (stopped) to finish (running) in close to four seconds and with attained top speeds of close to 300 miles per hour. The engines are drivingly coupled with transversely extending rear axles of the cars which axles carry driving wheels. The driving wheels are equipped with large pneumatic tires with extensive flat pavement-engaging treads. The engines and axles are drivingly coupled by drive shaft assemblies with centrifugal clutch mechanisms engaged therein and that are such that when the clutch mechanisms are engaged, direct drive is established between the engines and axles and thence to the wheels.

A serious shortcoming that exists in the above-noted direct drive between the engines and wheels of drag cars resides in the fact that the centrifugal clutches used, upon being operated to engage, at the starting gates of drag strips, rapidly fully engage or "lock-up" completely. Further, as drag racing cars commence to move and accelerate, the speed of their engines and the horsepower generated thereby increases at a rapid rate. As a result of the two above-noted factors, there is a great tendency for the increased power delivered by the engines to the wheels of the cars to cause the tires on the wheels of the cars to lose traction with the surface of the drag strips and to spin substantially freely. When traction is lost, as noted, the desired performance of the cars is materially reduced or lost. Further, when traction is lost, control of the cars is interfered with and possibly lost, with potentially disastrous results.

In an effort to eliminate or reduce the tendency for drag racing cars to lose traction with the drag strips over which they are operated, as noted above, the operators or drivers of those cars have sought to develop skilled manual operation of the clutches to cause the clutches to slip and/or have sought to skillfully slow the rate of acceleration of the engines of the cars, as by controlling the rate of delivery of fuel to them. While such efforts were effective in the past, when the factors of time, speed and power were less critical and manually controllable, they are, with but one or two minor exceptions, of little or no practical use today. Today, the rapid rates of the changes in speed and power and the notable reductions in elapsed time have reduced operator or driver control of drag race cars to little more than timely engagement of the clutches thereof, steering the cars down or along the drag strips and shutting the engines off after crossing the finish lines or gates.

In addition to the foregoing, traction between the wheels of drag cars and the drag strips over which they are operated, is often lost as a result of varying conditions of the surfaces of the drag strips caused by variations in the weather and by variations in the composition and physical nature of the paving materials that are used. Still further, the ability to maintain traction between the tires of drag cars and drag strip surfaces is materially affected by changes and/or alterations in the size, weight and firmness of the tires, differences or variations in the rubber-like compounds of which the tires are made and certain other physical variables that are encountered and must be dealt with.

In the recent past, there are those in the art who have made efforts to provide means to manually or otherwise control and slow the rate at which the centrifugal clutches in drag race cars engage and/or to cause those clutches to slip in some controlled manner. Those mans of which we are aware have consisted of special control devices that are operatively related to the clutch release forks for the clutch mechanisms and that control operation of those forks in a predetermined manner whereby the clutches are caused to slip. To the best our knowledge and belief, those special prior art devices have attained limited and/or questionable beneficial results. This is primarily due to the fact that the release fork mechanisms of clutches are rather loose and sloppy mechanisms that cannot be satisfactorily adjusted; and, they are structurally so weak and are so poorly balanced that they cannot be made to operate accurately and dependably to cause prolonged uniform slippage of their rebuilt clutches. They are only effective to cause brief momentary slippage or total disengagement of the clutch in what might fairly be called emergency situations.

OBJECTIVES AND FEATURES OF OUR INVENTION

It is an object of our invention to provide a novel centrifugal clutch controller that operates to control the rate of increase of plate pressure in the centrifugal clutch, independent of the rate of rotation of the clutch.

It is another object and a feature of our invention to provide a controller of the general character referred to above that includes a fluid actuated cylinder and piston device or unit of which acts upon the pivotally supported actuating weights of the centrifugal clutch with which the controller is related to stop free pivotal movement of the weights from their unactuated position to their fully actuated position and that moves relative to the clutch to allow the weights to move toward their fully actuated positions at predetermined and controlled rate or rates.

Yet another object and a feature of our invention is to provide a controller of the general character referred to above wherein the centrifugal clutch includes a central longitudinally extending clutch shaft, an engine-driven flywheel, an alternating series of annular, axially shiftable disks and plates in rotary driving engagement with the shaft and with the flywheel, respectively, an annular pressure plate assembly rearward of the rear-most disk and including a plurality of circumferentially spaced cam-like actuating weights that are caused to pivot and urge the plates and disks into pressure engagement with each other when the clutch rotates, said weights have radially inwardly projecting actuating arms that engage a forwardly disposed surface of a throw-out bearing positioned about the shaft and that is shiftable axially to pivot the arms and their weights to relieve pressure imposed by the weights onto the and through the related disks and plates; the cylinder and piston of said controller are annular parts freely engaged about said shaft rearward of said arms, said piston has a rod that carries the throw-out bearing for the clutch and normally holds that bearing forward in stopped engagement with the actuating arms of the actuating weights, said cylinder, piston and rod operate to move the throw-out bearing rearward at controlled rate and to thereby control the rate and extent of pivotal movement of the actuating weights and to thereby control the rate of increase of pressure exerted by said weights onto and through the plates and disks.

It is an object and feature of the invention to provide a controller of the general character referred to above wherein the cylinder is in fixed axial position relative to the clutch and a controller that includes novel adjustable stop means that limits forward travel of the rod and that affords easy, convenient and accurate adjustment of axial movement of the rod to compensate for axial displacement of the actuating arms caused by wear of parts of the clutch.

Still another object and feature of our invention is to provide a controller of the general character referred to above wherein the throw-out bearing has a fork collar related to it and a release fork is provided to engage with the collar, said fork is selectively manually operable to move the throw-out bearing rearward and to thereby pivot the actuating arms and actuating weights so as to reduce the pressure exerted by the weights onto and through the plates and disks and to allow the clutch to slip.

An object and feature of the invention is to provide a controller of the general character referred to above wherein the cylinder is normally charged with a pressurized fluid medium that urges and holds the piston in a foremost position and includes means to bleed or conduct said fluid medium from within the cylinder at predetermined programmed rates and to thereby allow the piston to be moved rearwardly at predetermined rates by those forces that are generated by the actuating weights and directed by the actuating arms to the throw-out bearing on the ram; said means to bleed the fluid medium from within the cylinder includes a plurality of fluid conducting outlet ports in the cylinder, fluid outlet lines connected with the ports, fluid metering means in the lines, on-and-off valves in the lines, and, valve actuating means connecting with the valves and functioning to open and close the valves in a predetermined programmed manner.

The foregoing and other objects and features of our invention will be apparent and will be fully understood from the following detailed description of the typical preferred embodiment of our invention throughout which description reference is made to the accompanying drawings.

DESCRIPTION OF THE DRAWINGS

FIG. 1 is an longitudinal elevational view of our new controller showing it related to a clutch mechanism and a reversing unit;

FIG. 2 is an enlarged detailed sectional view of the structure shown in FIG. 1 and taken substantially as indicated by Line 2—2 on FIG. 1;

FIG. 3 is a view taken substantially as indicated by Line 3—3 on FIG. 1; and

FIG. 4 is a diagrammatic view of a portion of our new controller and its related fluid handling support system.

DETAILED DESCRIPTION OF THE INVENTION

Referring to FIG. 1 of the drawings; our new controller C is shown engaged in a portion of the drive train for an engine-driven vehicle, such as a drag racing car. The controller C is connected with and between a centrifugal clutch mechanism M and a reversing unit U.

The clutch mechanism M that we have elected to illustrate is a common form of centrifugal clutch; and, the reversing unit U is a simple form of manually operable planetary gear type reversing unit. The unit U is an optional piece of equipment and can vary widely in form and construction. As here used, the unit U satisfies the requirement that drag racing vehicles or cars be capable of being driven in reverse or "backed-up".

As shown, the unit U includes an elongate gear case 10 with front and rear ends, a rearwardly outwardly projecting annular mounting flange at its front end; a central forwardly disposed shaft coupling part 12 at is front end; a central, rearwardly projecting, propeller shaft 13 at its rear end; and, a transversely extending rotatable actuating shaft 14 that projects laterally from the case 10 and that is engaged by a manually operable link and/or lever type shifting means (not shown). The propeller shaft 13 extends to and connects with the differential gear or equivalent gearing at the drive axle of the car of which the noted drive train is a part. The unit U is operable to selectively reverse the rotation of the shaft 13 by turning the shaft 14.

Since the details of design and construction of the unit U can vary widely without in any way of affecting the novelty of our invention, and since that unit is a supplemental device, we will not burden this disclosure with further detailed illustration and description thereof.

The clutch mechanism M is an elongate centrifugally actuated (closing) clutch mechanism with front and rear ends. The clutch is characterized by a front flywheel 20, a rear annular plate-like carrier ring 21 spaced rearward from and drivingly coupled with the flywheel by an outer annular drive structure 22, an elongate central clutch shaft 23 with front and rear end portions; a rear axially shiftable pressure plate 24 forward of the ring 21 and drivingly coupled with the drive structure 22; a plurality of driven plates 25 between the pressure plate and the flywheel and in rotary driving engagement with the drive structure 22; and, a plurality of annular drive disks 26 arranged between the plates and in axially shiftable rotary driving engagement with the forward portion of the shaft 23. The clutch mechanism further includes suitable spring means S connected with and between the carrier ring 21 and the pressure plate 24 to normally yieldingly urge the plate 24 rearwardly to a normal unactuated position where the alternate series or "stack" of plates and disks are out of pressure engagement with each other and between the flywheel and pressure plate. The clutch mechanism M next includes centrifugal actuating means A that operates to urge the pressure plate 24, plates 25 and disks 26 forwardly into frictional driving engagement with the flywheel and with each other, to establish rotary driving engagement between the flywheel and the shaft when the rate of rotation of the flywheel is accelerated above a predetermined low or "idle" speed.

The flywheel 20 is shown secured to the rear end of the crankshaft 30 of an internal combustion engine E in accordance with common practice.

In the form of the invention shown, the drive structure 22 connecting the flywheel 20 and carrier ring 21 and which is drivingly coupled with the plates 24 and 25 includes a plurality of circumferentially spaced posts 22 connected with the extending between the flywheel and the carrier ring. The posts enter notches in the several plates to establish rotary driving engagement therebetween. Other distinct forms of drive structures exist and can be used without in any way affecting our invention.

In accordance with common practices, the disks 26 have splined central openings that are slidably engaged about splined portions of the shaft 23 for free axial shifting and rotary driving engagement therebetween.

In practice, the forward end of the shaft 23 is provided with a pilot pin that is engaged in a pilot bearing in the flywheel or rear end of the crankshaft.

The actuating means A includes a plurality of circumferentially spaced radially extending and axially projecting plate-like actuating weights 40 pivotally connected with the carrier ring 21 by means of pivot pins 41 engaged through forward portions of the weights on axes normal to the radial plane of the weights. The weights 40 have forward cam faces 42 that engage rear surfaces on the plate 24 to normally hold the plate 24 (axially) in a normal or unactuated position and that operate to move the plate 24 forwardly, to actuated positions, when the rear portion of the weights are caused to swing radially outwardly by centrifugal force.

The rear portions of the weights 40 can be provided with supplemental weight means, such as nut and bolt assemblies 44.

In addition to the above, the weights 40 have radially inwardly projecting actuating mans 45 that swing rearwardly and radially outwardly when the weights 40 are caused to pivot or swing, as noted above. The radial inner ends of the arms 45 are adapted to be releasably engaged by an annual anti-friction throw-out bearing 46 that is engaged about the shaft 23, rearward of the arms, and that engages and pivots the arms forward, from actuated positions to normal or unactuated positions and to thereby disengage or release the clutch mechanism, when circumstances require.

Ordinarily and in accordance with common practices, the throw-out bearing 46 is carried by a yoke or fork collar 47 that, in turn, is carried by a releasing fork 48 on and projecting from a laterally extending release shaft 49 that occurs below the shaft 23 and that extends transverse the central vertical longitudinal plane of the shaft 23.

The shaft 49 is most commonly connected with a pedal lever arm (not shown) and is rotatably supported by suitable bearing means on a related bell housing that occurs about the clutch mechanism.

It is to be noted that the details of the centrifugal clutch mechanism illustrated and described above can vary widely without departing from or affecting the present invention. The single necessary structural detail of the clutch structure, that is necessary for carrying out our invention, is the presence of a plurality of circumferentially spaced actuating arms on the actuating weights, the inner ends of which arms can be shifted or moved axially forwardly to control pivotal movement of the actuating weights and thereby counter and/or control those centrifugal forces that are generated by the weights, as noted above.

In the form of the clutch mechanism that we have elected to illustrate, that portion of the mechanism which is necessary to that put our invention into practice is shown in FIG. 2 of the drawings.

In accordance with common practices and as shown in the drawings, the clutch mechanism M is shown shrouded by a bell housing H that is fastened to the block of the engine E to project rearwardly therefrom. The housing H has a substantially cylindrical outer side wall 50 that surrounds the clutch mechanism and has a radially extending rear wall 51 with a central opening 52 through which the rear end portion of the shaft 23 freely projects. The shaft 49 that carries the release fork 48 extends through and is rotatably carried by the side wall of the housing.

The controller C is an elongate axially extending unit having front and rear ends. The controller includes a central longitudinally extending shaft which, in the case illustrated, is established by an elongate rearwardly projecting extension on the clutch shaft 23. The controller next includes an elongate axially extending cylinder, identified by the reference character C. The cylinder C has a cylindrical longitudinally extending outer wall 55 defining a bore 56, a radially extending rear wall 57 with an elongate central forwardly projecting tubular core 58 that is substantially coextensive with the longitudinal extend of the cylinder and through which the shaft 23 freely extends. In the preferred carrying out of our invention, the front end of the reversing unit U is fastened to and/or mounted on the rear wall 57 of the cylinder. In the case illustrated, the cylinder has a rearwardly projecting annular mounting flange 59 through which the flange 11 of the unit U is screw fastened and that cooperates with the rear wall 57 of the cylinder to define a space that accommodates the forwardly projecting part 12 of the unit U. The rear end of the shaft 23 is shown formed with a splined portion 23' that is cooperatively engaged in the coupling part 12 of the unit.

The front end of the cylinder is open and is normally covered by or closed by a flat radially extending annular head or cover plate 60 that is screw fastened to the cylinder, substantially as shown. The plate or head 60 has an outer mounting flange portion that projects radially outward from the cylinder and that occurs adjacent to and is screw fastened to the rear wall 57 of the housing H, substantially as shown.

The controller C next includes an annular piston P slidably engaged in the bore 56 of the cylinder and about the forwardly projecting tubular core 58 of the cylinder. The piston is shiftable axially rearwardly and forwardly in the cylinder and carries inner and outer seals (O-rings) O and O' that seal between the piston and the bore and between the piston and the core, respectively.

The piston has a forwardly projecting tubular rod 65 in which the core 58 is slidably engaged for free longitudinal shifting relative thereto. The rod 65 is slidably engaged through and projects freely forwardly from a central opening 61 in the head that registers with the opening 52 in the rear wall of the housing H. The rod 65 has a flat radially extending forwardly disposed work engaging end surface 66 and is preferably formed with a radially inwardly projecting annular sleeve guide flange 67, as shown.

The controller C next includes an elongate tubular sleeve 70 through which the shaft 23 freely extends. The sleeve 70 has a rear end portion that is freely slidably engaged in the tubular core 58 and a forward portion that projects freely forwardly from the piston rod 65 and that is slidably engaged through the annular guide flange 67, as shown.

The forward free end of the sleeve 70 has a throw-out bearing and fork collar mounting means. In the form of the invention shown, that mounting means includes a radially outwardly projecting stop flange 71 that is spaced rearward from the forward end of the sleeve and that cooperates therewith to define a forwardly and radially outwardly opening seat in which an (the) annular throw-out bearing 46 is press fitted and stopped. An (the) annular fork collar 47 is press fitted on and about the flange 71. The bearing 46 and collar 47 can be secured to the sleeve by any suitable supplemental fastening and securing means that might serve, if circumstances require.

The bearing 46 has a front forwardly disposed bearing surface that opposes and normally engages the inner rear ends of the actuating arms 45 of the clutch actuating means A with which the controller is related; as shown.

The controller C next preferably includes primary shim type adjusting means S that is operable to adjust the longitudinal or axial position of the throw-out bearing 46 so that when the piston P is in its foremost position in the cylinder C, the bearing 46 stops at or in close proximity with the arms 45 when those arms and their related actuating weights are in their normal unactuated positions. That is, the means S function to adjust the overall effective longitudinal or axial extent of the bearing, sleeve, rod and piston subassembly. In the case illustrated, the means S includes one or more flat radially disposed annular shim washers of different axial extent or thickness. The washers are slidably engaged about the sleeve 70 and occur between the front end of the rod 65 and the flange 71 on the sleeve. By selecting and using an appropriate set of washers, the axial positioning of the bearing 46 can be effectively adjusted.

Alternately, the means S might include a single tubular spacer cut to appropriate length instead of the noted washers; or, might include a short stop ring slidably engaged about the sleeve and releasably fastened in desired position thereon by means of a set screw or the like.

It is to be noted that the sleeve 70 is a "lost motion" sleeve that can be shifted forwardly relative to the piston 58 after the structure has operated to move the throw-out bearing 46 and the piston P rearward from their normal (forward) unactuated positions. Independent forward movement of the sleeve is necessary and/or desirable if and when it is desired to urge the actuating arms 45 forward (after the clutch has been actuated) to release or cause the clutch to slip. Causing the clutch to slip or to momentarily release is frequently required in drag racing cars and the like when the wheels or tires of the cars commence to lose traction with the roads or strips, or, when controlled guidance of the cars has been or is about to be lost.

In the form of our invention illustrated, after the clutch mechanism has been actuated and it is desired to release or cause it to slip, the operator or driver of the car can easily and conveniently urge the throw-out bearing 46 forward, by manual operation and forward pivoting of the clutch release fork 48 that engages the fork collar and throw-out bearing assembly that is mounted on and carried by the forward end of the sleeve. Forward movement of the throw-out bearing by operation of the release fork, as noted above, urges the actuating arms forwardly toward their unactuated position, causing the catch mechanism to release or slip.

Our new controller next includes a second adjusting means S that occurs between the forward surface of the piston P and the head 60 and the cylinder. The means S' can vary in form and construction and preferably includes a yoke-like shim carrier having a pair of laterally spaced vertical bar-like legs 75 with rearwardly disposed flat surfaces and a substantially horizontal, laterally extending, manually engagable bar 76 extending between the upper ends of the legs. The legs 75 are slidably engaged in a pair of laterally spaced upwardly and rearwardly opening channels 77 milled or otherwise established in the rear surface of the head 60 and opposing registering notches milled in the upper forward end portion of the cylinder. The legs 75 when in working position occur at opposite sides of the rod 65 and extend across the central horizontal plane of the cylinder and piston. The bar 76 normally rests upon and is stopped by the upwardly disposed outer edge portion or surface of the head 60. The means S next includes a flat elongate vertical stop bar or rear-most shim 80 extending longitudinally of and releasably screw fastened to the lower end portion of each leg 75, at the rear surface thereof; and, a plurality of elongate shim plates or strips 81 removably held in clamped engagement with and between the bars and the legs 75. The bars 80 are engaged by and stop the piston P when it is moved to its foremost or unactuated position in the cylinder C, stopping the throw-out bearing 46, related to the front ed of the rod 58 in a normal set or unactuated position where it is in substantial free-running engagement with the lower rear ends of the actuating arms 45 of the actuating means A, when those arms are in their normal unactuated position.

When and as the plates and disks and other parts of the clutch mechanism wear, the actuating arms 45 move or are displaced forwardly to new unactuated positions where they are spaced an excessive distance forward from the throw-out bearing 46. When this occurs and the clutch mechanism is rotated to cause it to close or actuate, the arms 45 must move rearwardly an excessive distance before they engage the bearing 46 and before the controller can have any operative effect. The foregoing can result in an appreciable adverse time delay.

When adverse wear of the parts of the clutch mechanism is perceived by an undesired time delay in operation of our new controller or when it is desired to alter the timing of our controller, the yoke of the means S' is manually withdrawn from engagement with the cylinder and head assembly and shims 81 are removed or added to that assembly, as circumstances require; and, the yoke is manually reengaged in working position. The foregoing adjustment can be carried out in but a few minutes of time without the use of any special tools or skills.

In addition to the foregoing, the cylinder of our controller is provided with motive fluid supply or delivery means D to deliver motive fluid under pressure into the rear end portion of the cylinder, rearward of the piston and fluid exhaust means E' to exhaust or bleed that fluid from the cylinder. The fluid introduced into the cylinder urges and holds the piston and all of the parts of the controller moved thereby to their forward or normal unactuated positions, where the throw-out bearing 46 stops rearward pivoting of the actuating arms 45 and the regular progressive increasing of plate pressure in and through the clutch, as rotation of the clutch is accelerated. The fluid exhaust means exhausts or bleeds the fluid from within the cylinder, reducing the volume of that fluid therein and allowing the piston to move rearwardly, at a predetermined or programmed rate. As the piston P moves rearward from its unactuated position, the throw-out bearing 46 moves rearwardly a corresponding distance and allows the actuating arm 45 to pivot or move progressively to increase the plate pressure directed by the actuating weights 40 into and through the clutch mechanism at a set or programmed rate independent of the speed at which the clutch mechanism is rotated or the magnitude of the centrifugal forces that are generated by the weights 40. Accordingly, the controller C functions to effect time controlled rate of increase in actuating force in and through the clutch mechanism. By controlling the rate of increase of actuating force in and through the clutch mechanism as noted above, the clutch can be made to slip a desired extent as the rate of rotation of the clutch is accelerated. In accordance with the foregoing, it will be apparent that the controller operates to control the work force or horsepower delivered by the clutch and is such that by suitably adjusting and controlling the rate at which fluid is exhausted from the cylinder, that is, the rate at which the controller operates, the work forces delivered to the drive wheels of a race car in which our controller is installed can be controlled so that work forces between the wheels and the racing surface over which the car is operated is very close to but is always less than those forces that are likely to cause the wheels to lose traction.

In the form of our invention illustration, the motive fluid is compressed air and the fluid delivery means D includes an air inlet port 90 in the rear portion of the cylinder, an air supply tank 91 remote from the controller, an air delivery line 92 extending between and suitably connected with the port 90 and the tank 91, an on-and-off valve 93 in the line, and, a flow metering device 94 engaged in the line between the valve and the port. The flow metering device 94 can be a manually adjustable flow metering valve or a simple orifice fitting.

In practice, the motive air can be at a pressure of, for example, 150 psi.

The fluid exhaust means E' preferably includes two exhaust ports 95 and 95' in the rear end portion of the cylinder, exhaust lines 96 and 96' suitably connected with the ports 95 and 95', flow metering devices, such as orifice fittings, 97 and 97' are engaged in the lines 96 and 96' and, on-and-off valves 98 and 98' are engaged in the lines, respectively.

The valve 93 can be a manually operated valve but is preferably a normally closed solenoid or electrically operated valve. The valves 98 and 98' are normally closed electrically operated (solenoid actuated) valves.

The valves 93, 98 and 98' are under control of a battery-powered timer mechanism M'. The mechanism M' that we have elected to illustrate includes a manually operable on-and-off or manning switch 100 that operates to open the valve 93 and to effect charging the cylinder with motive air. The mechanism M' next includes the normally open starter switch 101 that is suitably operatively connected with the fuel throttle or fuel supply means (not shown) of the engine with which the controller is related and that is closed when the speed of the engine with which the controller is related is increased from an idling speed at which the clutch mechanism is unactuated, to an operating speed where the clutch mechanism actuates or engages. The means M' next includes a clock motor 102 that is energized and starts to turn when the switch 101 closes. The clock motor 102 turns a pair of switch actuating cam parts 103 and 103'. The parts move to open switches 104 and 104' that are connected with the valves 98 and 98'.

The duration or time period of operation of the controller, after the switch 101 closes, can vary from about 3 seconds to 8 seconds. Accordingly, the motor and cams must rotate at a rather rapid rate.

In one sequence of operation, both of the valves 98 and 98' are caused to open as soon as the switch 101 is closed and the motor 102 is energized and the cams 103 and 103' turn. The valve 98 is left to remain open for but a moment and, together with the opened valve 98', exhausts sufficient air form the controller cylinder to initiate movement of the piston and its driven parts of the controller and to allow the actuating means A of the clutch mechanism to initiate engagement of the clutch mechanism. Thereafter, the valve 98 closes and the valve 98' remains open to continue to bleed air from within the cylinder at a predetermined rate that is greater than the rate at which air is delivered into the cylinder (as is determined by different flow rates of the flow metering device 94 and 97'). The valve 98' is left to remain open throughout operation or cycling of the controller and need not be caused to close until the controller is readied to be recycled.

Alternatively, the valve 98 can be the first valve to be opened subsequent to closing of the switch 101, to start and maintain a first stage of operation of the controller following which stage of operation the valve 98 is closed and the valve 98' is caused to open to maintain operation of the controller throughout a second stage of operation of the controller.

In either of the above noted sequences of operation, the valve 93 of the air delivery means D can be caused to close as soon as the valve 98 and/or the valve 98' is caused to open; since upon closing the valve 101 and starting operation of the controller, bleeding of the fluid medium and reduction of the volume and/or pressure of fluid in the cylinder is the only function required to effect control operation of the controller.

In furtherance of our invention, the number of ports, vales and meter devices with related cams and switches comprising the exhaust means E can be increased many times and various sequences of opening and closing the valves can be utilized.

It is to be understood that the electric timing means illustrated and described above is but one kind of timing means that can be advantageously employed in carrying out our invention.

We have produced our controller with multiplicities of exhaust ports and have connected various and different forms of flow-metering devices and control valves with those ports. We have changed the flow rate of certain of the flow-metering devices and have changed or varied both the sequence and timing of the control valves. In so doing, we have effectively adjusted the operation of our controller and its related clutch to better satisfy and/or meet the requirements of numerous variable factors and conditions that are encountered in the operation and use of the race car(s) in which our controller is embodied. For example, the cycling period for the controller has been adjusted and varied and its operation has been adjusted to follow plotted performance curves (lines) that correspond with plotted power output curves (lines) of either the engine or the drive wheels of the race car with which it is related (as determined by dynamometer tests). Thereafter, the controller has been further adjusted and programmed to compensate for and/or to take into account one or more variable factors and/or conditions such as the physical make-up and condition of the tires of the race car and/or the physical make-up and condition of the race course on which the race car is operated.

The foregoing has clearly demonstrated that our controller can be adjusted and made to function in substantially any desired, predetermined and/or programmed manner by using and adjusting exhaust means of the general character we have elected to illustrate and describe and/or many other equivalent means one might elect to use.

It has been contemplated that the means E' of our invention might include a single port in the cylinder and a single electrically operated variable flow control valve. While electrically operated variable flow control valves that might be made to effect operation of our controller are understood and believed to exist, we have yet to find such a valve that is commercially available and/or the cost of manufacture of which would make its adoption and use in carrying out invention practical.

It is important to note that working clearances between the opening 61 and the head 60 and the rod 65 and the clearance that occurs about the yoke of the means S' and its related parts of the head and cylinder are sufficient to vent the front portion of the cylinder.

It is also to be noted that the running clearances between the piston P and cylinder C and between the rod 65 and head 60 together with the inter-engaged or telescoping relationship of the sleeve 70, core 58 and rod 65 impart the controller with considerable structural stability and integrity, while allowing for generous tolerances between running parts. Accordingly, the controller is both easy and economical to make and is little affected by extreme changes in temperature, the presence of moisture and the like.

An extremely important characteristic and feature of our new controller resides in the fact that it is circular and concentric with he clutch and, particularly, with the annular series of actuating arms thereof. As a result, the controller establishes and maintains properly directed and uniform engagement with the actuating arms of the clutch at all times and is not subject to working and becoming displaced radially and/or axially, from proper and effective working relationship with the actuating arms during operation of the clutch and controller assembly.

The above distinguishes our new controller from various link and lever type throw-out bearing actuating means that are used to release and sometimes to control the operation of centrifugal clutches and that are so "sloppy" and structurally unstable that they are slow to respond and tend to rack and work out of set alignment with the actuating arms of their related clutches when put to use. While the slop and structural instability of the noted link and lever type throw-out bearing actuating means is tolerable in low power and slow operating conditions, it is unacceptable in those high power, fast operating conditions that our new controller is uniquely suited to be used in.

Having described only one typical preferred form and application of our invention, we do not wish to limit ourselves to the specific details herein set forth but wish to reserve to ourselves any modifications and/or variations that might appear to those who are skilled in the art and which fall within the scope of the following claims.

Having described our invention, we claim:

1. An elongate centrifugal clutch with front and rear ends, a front drive part in rotary driving engagement with a crankshaft of a related engine, a central elongate clutch shaft concentric with and rearward of the crankshaft, a plurality of annular, radially extending, axially spaced plates about the shaft and in rotary driving engagement with the drive part, annular radially extending driven disks between the plates and in rotary driving engagement with the shaft, a carrier part rearward of the plates in axial fixed and rotary driving engagement with the drive part, and, a plurality of actuating weights pivotally carried by the carrier part and having cam parts that engage and urge the rear-most plate forward and that have radially inwardly projecting actuating arms that pivot rearwardly when the clutch is rotated and the weights are caused to pivot radially outward; a controller to engage and slow rearward pivoting of the arms and including, an annular throw-out bearing about the shaft rearward of and normally engaging the arms, an elongate cylinder with front and rear ends mounted in fixed axial spaced relationship rearward of the bearing, a piston in the cylinder, an elongate rod on the piston and projecting forwardly from the cylinder and connected with the bearing, fluid inlet and exhaust ports in the cylinder rearward of the piston, a motive fluid supply connected with the inlet port and operable to conduct motive fluid into the cylinder to move the piston, rod and bearing forward to a stop forward unactuated position where said bearing engages said actuating arms when said arms are in a normal unactuated forward position, and, a fluid exhaust connected with the exhaust ports and operating to bleed fluid from within the cylinder at a rate to allow the piston, rod and bearing to move rearwardly and the arms to pivot rearwardly from their unactuated position at a predetermined controlled rate.

2. The structure set forth in claim 1 wherein the cylinder has a rear end wall and a forwardly and rearwardly opening central tubular core projecting forwardly from said wall, the piston is an annular part engaged about said core and said rod is an elongate forwardly and rearwardly opening tubular part projecting forwardly from the piston and from within the cylinder, the shaft of the clutch projects freely rearwardly through said rod and core.

3. The structure set forth in claim 2 wherein the throw-out bearing is mounted on a forward end of an elongate tubular sleeve through which the shaft freely extends and has a rear portion extending rearwardly within the rod and into the core, said sleeve has a radially outwardly projecting stop at its front end portion with a rear surface that opposes the front end of the rod.

4. The structure set forth in claim 3 that further includes a fork collar carried by the front end portion of the sleeve and a release fork engaging the collar and selectively manually operable to move the collar, sleeve, bearing and the actuating arms forward.

5. The structure set forth in claim 4 that further includes at least one spacer part in normal stopped engagement with and between the stop on the sleeve and the front end of the rod, said spacer part adjusts an effective longitudinal extent of a rod and sleeve subassembly.

6. A controller to restrain and slow a rate of movement of actuating arms on pivotally mounted centrifugally driven actuating weights of a centrifugal clutch mechanism, said controller includes an elongate cylinder with front and rear ends mounted in fixed spaced relationship with the clutch mechanism with its front end opposing the direction of movement of the actuating arms when the clutch mechanism is rotated and the arms are progressively moved from a normal unactuated position to actuated positions, an axially shiftable piston in the cylinder and normally stopped in the front end portion thereof, and elongate piston rod with front and rear ends carried by the piston and projecting forwardly therefrom and from within the cylinder toward the actuating arms, a throw-out bearing carried by the front end of the rod in opposing relationship with the actuating arms to restrain movement thereof from their unactuated positions to actuated positions, motive fluid inlet and outlet ports in the rear end of the cylinder, a motive fluid supply system connected with the inlet port and operating to conduct motive fluid into the cylinder to urge and normally hold the piston, rod and bearing in forward unactuated positions, a motive fluid exhaust system connected with the outlet port and operating to conduct motive fluid from within the cylinder at a controlled rate to allow the arms to move a bearing, rod and piston subassembly rearwardly at a controlled rate.

7. The controller set forth in claim 6 wherein the bearing is mounted on a front end of an elongate sleeve telescopically engaged with and projecting from the front end of the rod, said sleeve has a rearwardly disposed stop surface forward of and opposing the front end of the rod, a spacer part is positioned between the front end of the rod and said stop surface to adjust and set an effective longitudinal extent of a rod, sleeve and bearing subassembly.

8. The controller set forth in claim 6 wherein the bearing is mounted on a front end of an elongate sleeve telescopically engaged with and projecting from the front end of the rod, said sleeve has a rearwardly disposed stop surface forward of and opposing the front end of the rod, a fork collar is mounted about the sleeve forward of the rod and a manually operable release fork is engaged with the collar and is operable after the arms have moved to actuated positions to urge a collar, sleeve and bearing subassembly forward relative to the rod and to move the arms toward their unactuated position.

9. The controller set forth in claim 6 wherein the bearing is mounted on a front end of an elongate sleeve telescopically engaged with and projecting from the front end of the rod, said sleeve has a rearwardly disposed stop surface forward of and opposing the front end of the rod, a fork collar is mounted about the sleeve forward of the rod and a manually operable release fork is engaged with the collar and is operable after the arms have moved to actuated positions to urge a collar, sleeve and bearing subassembly forward relative to the rod and to move the arms toward their unactuated position, a spacer part is positioned between the front end of the rod and said stop surface to adjust and set an effective longitudinal extent of a rod, sleeve and bearing subassembly.

10. The controller set forth in claim 6 that further includes adjustable stop means to adjust and set the normal forward stopped position of the piston, rod and bearing subassembly and including a carrier part manually movable into and out of axial stopped engagement with a portion of the cylinder forward of the piston, a stop part releasably secured to the carrier part and engagable with the piston and one or more shim parts selectively removably engaged between the carrier and stop parts.

11. The controller set forth in claim 6 wherein the bearing is mounted on a front end of an elongate sleeve telescopically engaged with and projecting from the front end of the rod, said sleeve has a rearwardly disposed stop surface forward of and opposing the front end of the rod, a spacer part is positioned between the front end of the rod and said stop surface to adjust and set the effective longitudinal extent of the rod, sleeve and bearing subassembly; controller that further includes adjustable stop means to adjust and set the normal forward stopped position of the piston, rod and bearing subassembly and including a carrier part manually movable into and out of axial stopped engagement with a portion of the cylinder forward of the piston, a stop part releasably secured to the carrier part and engagable with the piston and one or more shim parts selectively removably engaged between the carrier and stop parts.

12. The controller set forth in claim 6 wherein the bearing is mounted on a front end of an elongate sleeve telescopically engaged with and projecting from the front end of the rod, said sleeve has a rearwardly disposed stop surface forward of and opposing the front end of the rod, a fork collar is mounted about the sleeve forward of the rod and a manually operable release fork is engaged with the collar and is operable after the arms have moved to actuated positions to urge a collar, sleeve and bearing subassembly forward relative to the rod and to move the arms toward their unactuated position; said controller further includes adjustable stop means to adjust and set a normal forward stopped position of the piston, rod and bearing subassembly and including a carrier part manually movable into and out of axial stopped engagement with a portion of the cylinder forward of the piston, a stop part releasably secured to the carrier part and engageable with the piston and one or more shim parts selectively removably engaged between the carrier and stop parts.

13. The controller set forth in claim 6 wherein the bearing is mounted on a front end of an elongate sleeve telescopically engaged with and projecting from the front end of the rod, said sleeve has a rearwardly disposed stop surface forward of and opposing the front end of the rod, a fork collar is mounted about the sleeve forward of the rod and a manually operable release fork is engaged with the collar and is operable after the arms have moved to actuated positions to urge a collar, sleeve and bearing subassembly forward relative to the rod and to move the arms toward their unactuated position, a spacer part is positioned between the front end of the rod and said stop surface to adjust and set an effective longitudinal extent of a rod, sleeve and bearing subassembly; said controller further includes adjustable stop means to adjust and set a normal forward stopped position of the piston, rod and bearing subassembly and including a carrier part manually movable into and out of axial stopped engagement with a portion of the cylinder forward of the piston, a stop part releasably secured to the carrier part and engagable with the piston and one or more shim parts selectively removably engaged between the carrier and stop parts.

14. A controller to restrain and slow a rate of movement of actuating arms on pivotally mounted centrifugally driven actuating weights of a centrifugal clutch mechanism, said controller includes an elongate cylinder with front and rear ends and a central longitudinally extending tubular core mounted in fixed space relationship with the clutch mechanism with the front end of the cylinder opposing direction of movement of the actuating arms when the clutch mechanism is rotated and the arms are progressively moved from a normal unactuated position to actuated positions, an annular piston slidably engaged within the cylinder and about the core and normally stopped in the front end of the cylinder, an elongate tubular piston rod telescopically engaged about the core and projecting forwardly from the piston and the cylinder toward the actuating arms, and annular throw-out bearing carried by a front end of the rod and in close working relationship with the actuating arms to restrain movement thereof from their unactuated position to actuating positions, the core and rod define a longitudinal passage through the controller through which a rearwardly projecting portion of a shaft of the clutch mechanism freely extends, motive fluid inlet and outlet ports in the rear end of the cylinder, a motive fluid supply system connected with the inlet port and operating to conduct motive fluid into a cylinder to urge and normally hold the piston, rod and bearing subassembly in forward unactuated positions, a motive fluid exhaust system connected with the outlet port and operating to conduct motive fluid from within the cylinder at a controlled rate to allow the arms to move the bearing, rod and piston subassembly rearward at a controlled rate.

15. The controller set forth in claim 14 wherein the bearing is mounted on a front end of an elongate sleeve telescopically engaged with and projecting from the front end of the rod, said sleeve has a rearwardly disposed stop surface forward of and opposing the front end of the rod, a spacer part is positioned between the front end of the rod and said stop surface to adjust and set an effective longitudinal extent of a rod, sleeve and bearing subassembly.

16. The controller set forth in claim 14 wherein the bearing is mounted on a front end of an elongate sleeve telescopically engaged with and projecting from the front end of the rod, said sleeve has a rearwardly disposed stop surface forward of and opposing the front end of the rod, a fork collar is mounted about the sleeve forward of the rod and a manually operable release fork is engaged with the collar and is operable after the arms have moved to actuated positions to urge a collar, sleeve and bearing subassembly forward relative to the rod and to move the arms toward their unactuated position.

17. The controller set forth in claim 14 wherein the bearing is mounted on a front end of an elongate sleeve telescopically engaged with and projecting from the front end of the rod, said sleeve has a rearwardly disposed stop surface forward of and opposing the front end of the rod, a fork collar is mounted about the sleeve forward of the rod and a manually operable release fork is engaged with the collar and is operable after the arms have moved to actuated positions to urge the collar, sleeve and bearing subassembly forward relative to the rod and to move the arms toward their unactuated position, a spacer part is positioned between the front end of the rod and said stop surface to adjust and set an effective longitudinal extent of a rod, sleeve and bearing subassembly.

18. The controller set forth in claim 14 that further includes adjustable stop means to adjust and set the normal forward stopped position of the piston, rod and bearing subassembly and including a carrier part manually movable into and out of axial stopped engagement with a portion of the cylinder forward of the piston, a stop part releasably secured to the carrier part and engagable with the piston and one or more shim parts selectively removably engaged between the carrier and stop parts.

19. The controller set forth in claim 14 wherein the bearing is mounted on a front end of an elongate sleeve telescopically engaged with and projecting from the front end of the rod, said sleeve has a rearwardly disposed stop surface forward of and opposing the front end of the rod, a spacer part is positioned between the front end of the rod and said stop surface to adjust and set an effective longitudinal extent of a rod, sleeve and bearing subassembly; said controller further includes adjustable stop means to adjust and set a normal forward stopped position of the piston, rod and bearing subassembly and including a carrier part manually movable into and out of axial stopped engagement with a portion of the cylinder forward of the piston, a stop part releasably secured to the carrier part and engagable with the piston and one or more shim parts selectively removably engaged between the carrier and stop parts.

20. The controller set forth in claim 14 wherein the bearing is mounted on a front end of an elongate sleeve telescopically engaged with and projecting from the front end of the rod, said sleeve has a rearwardly disposed stop surface forward of and opposing the front end of the rod, a fork collar is mounted about the sleeve forward of the rod and a manually operable release fork is engaged with the collar and is operable after the arms have moved to actuated positions to urge a collar, sleeve and bearing subassembly forward relative to the rod and to move the arms toward their unactuated position; said controller further includes adjustable stop means to adjust and set a normal forward stopped position of the piston, rod and bearing subassembly and including a carrier part manually movable into and out of axial stopped engagement with a portion of the cylinder forward of the piston, a stop part releasably secured to the carrier part and engagable with the piston and one or more shim parts selectively removably engaged between the carrier and stop parts.

21. The controller set forth in claim 14 wherein the bearing is mounted on a front end of an elongate sleeve telescopically engaged with and projecting from the front end of the rod, said sleeve has a rearwardly disposed stop surface forward of and opposing the front end of the rod, a fork collar is mounted about the sleeve forward of the rod and a manually operable release fork is engaged with the collar and is operable after the arms have moved to actuated positions to urge a collar, sleeve and bearing subassembly forward relative to the rod and to move the arms toward their unactuated position, a spacer part is positioned between the front end of the rod and said stop surface to adjust and set an effective longitudinal extent of the rod, sleeve and bearing subassembly.

* * * * *